Figure 1:
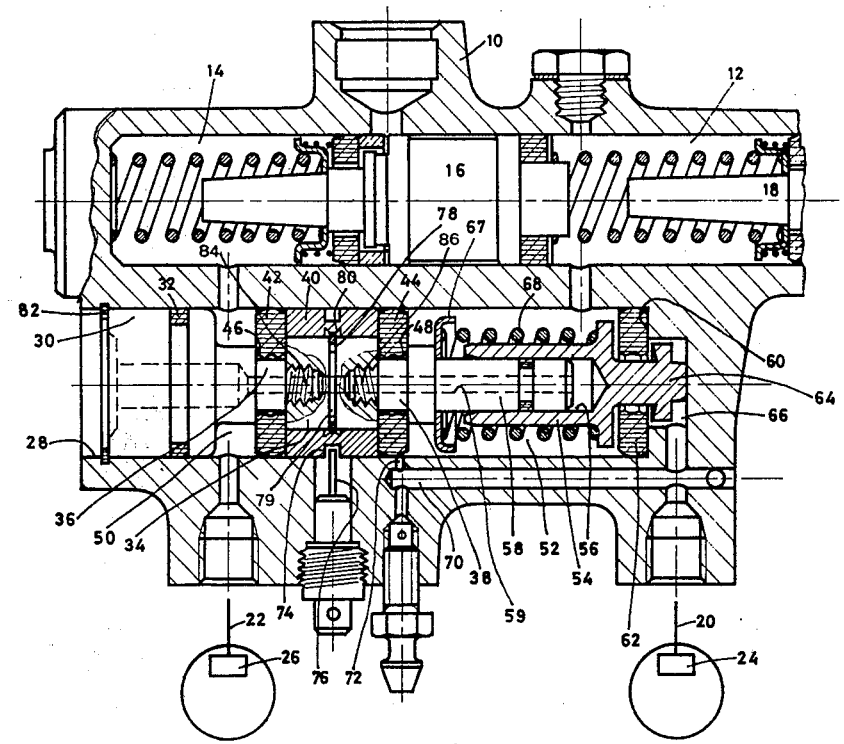

United States Patent [19]

Cadeddu

[11] 4,017,124

[45] Apr. 12, 1977

[54] PRESSURE FAILURE WARNING DEVICE

[75] Inventor: Leonardo Cadeddu, Crema, Italy

[73] Assignee: Benditalia S.p.A., Crema, Italy

[22] Filed: Jan. 7, 1976

[21] Appl. No.: 647,303

[30] Foreign Application Priority Data

Jan. 9, 1975   Italy ................... 19115/75

[52] U.S. Cl. ........................ 303/6 C; 200/82 D;
340/52 C

[51] Int. Cl.² ........................................ B60T 8/26

[58] Field of Search ....... 200/82 D; 303/6 C, 84 A,
303/84 R; 340/52 C, 240, 242

[56] References Cited

UNITED STATES PATENTS

| | | | |
|---|---|---|---|
| 3,672,732 | 6/1972 | Green | 303/84 A |
| 3,773,363 | 11/1973 | Papin | 303/6 C |
| 3,774,974 | 11/1973 | Braun | 303/84 A X |
| 3,872,885 | 3/1975 | Eloi et al. | 340/52 C X |
| 3,916,129 | 10/1975 | Cadeddu | 340/52 C X |
| 3,947,648 | 3/1976 | Muterel | 200/82 D |

*Primary Examiner*—Duane A. Reger
*Attorney, Agent, or Firm*—Ken C. Decker; William N. Antonis; Paul D. Schoenle

[57] ABSTRACT

The invention relates to a failure detector for a dual hydraulic circuit such as a dual brake circuit in a motor vehicle. The detector comprises a movable piston assembly so as to define in a bore on opposite sides thereof two pressure chambers. Switch means are provided to make electrical contact when the movable assembly moves in certain direction from a central idle position due to pressure imbalance between the chambers. The movable assembly comprises a sleeve acting with the switch means and two resilient discs. The sleeve is mounted in a core fixed to a plug mounted in the bore and having the same axial length as the sleeve. The two discs are sealingly slidable along the bore and mounted in a fluid-tight manner on two axial projections attached to the opposite sides of the core and being smaller in diameter than the core.

9 Claims, 2 Drawing Figures

PRESSURE FAILURE WARNING DEVICE

The invention relates to a failure detector for a dual hydraulic circuit, such as a dual brake circuit in a motor vehicle.

Prior proposals concern a pressure failure detector comprising a housing containing a bore which slidably receives a movable piston-forming assembly so as to define in this bore on opposite sides of the movable assembly two pressure chambers connectible to two independent circuits, switch means being provided to make electrical contact when the movable assembly moves in either direction from a central idle position due to a pressure difference denoting failure of one of the circuits.

While the detector proposed in the said published Application operates correctly, it suffers from manufacturing problems which make its cost price high. The particular construction proposed is such that various steps and grooves must be machined very accurately in the bore in the housing, which is always difficult and troublesome. During assembly of the detector, moreover, its components must be mounted in the housing one by one, and this too is difficult in view of the little space available for assembly in the housing.

The invention proposes a detector whose construction permits both easy manufacture of its various components and easy assembly of these components, so greatly facilitating production of the detector. According to the invention the detector is characterized in that the movable assembly comprises a sleeve and two annular resilient discs, said sleeve cooperating with the switch means and being slidable on a cylindrical core fixed relatively to the housing, the core being coaxial with the bore and of the same axial length as the sleeve, said two annular resilient discs being sealingly slidable along the bore and mounted in a fluid-tight manner on two axial projections attached to opposite sides of the core and being smaller in diameter than the core, one face of each resilient disc being partly in contact with the end of the sleeve and partly in contact with one side of the core when the movable assembly is in said central idle position such that the core is entirely contained within the sleeve.

As will be clear from the description, the construction of the proposed detector is such that its various components can be preassembled round the core before the whole is inserted in the central bore in the housing.

Figure 2:
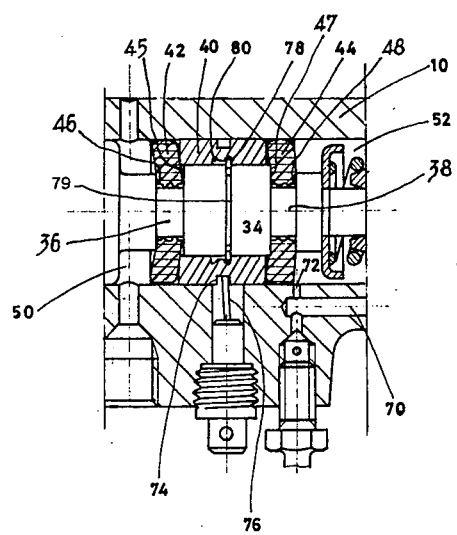

The invention will be better understood from the ensuing description referring to the drawings, in which:

FIG. 1 represents a section through a failure detector incorporated in the housing of a dual braking master cylinder; and FIG. 2 shows part of the detector shown in FIG. 1 when a failure has occured in one of the pressure chambers.

FIG. 1 illustrates diagrammatically a dual hydraulic brake circuit for a motor vehicle. A conventional dual master cylinder has a housing 10 containing two chambers 12, 14 separated by a floating piston 16. A primary piston 18, of which only part is shown, is moved by the vehicle driver's pedal to the left in FIG. 1 to apply pressure to the chambers 12, 14. The two chambers are connected by two lines 20, 22 respectively to the rear brakes 24 and front brakes 26 of the motor vehicle. In the particular embodiment here described, the failure detector shares the same housing as the master cylinder, in order to save space. However, within the scope of the invention, the detector may have a separate housing from the master cylinder. The housing 10, which will now be regarded as the housing of the detector, contains a central bore 28 stopped by a plug 30 with a seal 32. A core 34 is connected within the housing fixed relatively thereto, more specifically the core 34 is attached to the plug 30. The opposite sides 45, 47 of the core bear respective axial projections 36, 38, smaller in diameter than the core. Around the core there lies the movable assembly of the failure detector, comprising a sleeve 40, slidable in the central bore 28, and two annular resilient discs 42, 44 situated on opposite sides of the sleeve 40. These discs 42, 44 are also slidable along the central bore 28, and they cooperate in a fluid-tight manner with the projections 36, 38. The discs are of elastomeric material, such as rubber. As FIG. 1 shows, the sleeve 40 and core 34 are coaxial with the central bore 28 and have identical axial lengths. In the embodiment of the invention illustrated in FIG. 1 the projections 36, 38 are limited by two annular shoulders 46, 48 on the side remote from the sides of the core 45, 47 and by the sides 45, 47 of the core so forming grooves in which the central portions of the annular discs are slightly compressed. In a variant of the invention (not shown) the shoulders 46, 48 are slightly further from the core, so that the discs 42, 44 are urged on to the core by way of compression springs supported against the shoulders. FIG. 1 shows the movable assembly in its central, idle position. It defines inside the bore 28 two pressure chambers: a chamber 50 connected to the line 22, and a chamber 52 connected to the line 20 by way of a braking compensating valve which will now be described. In this idle position of the detector, the core 34 is entirely contained within the sleeve 40 and one face of each resilient disc 42, 44 is partly in contact with one end of the sleeve and partly in contact with one side 45, 47 of the core.

The braking compensating valve consists essentially of a differential piston 54 with an internal blind bore 56 which is slidable in a fluid-tight manner on a tube 58 attached to the projection 38 and therefore to the plug 30. The tube 58 is coaxial with the central bore 28 an contains an axial duct 59 (indicated by broken lines) connecting the compartment defined at the blind end of the internal bore 56 with a source of control pressure. In this described embodiment of the invention, the control pressure consists in the atmospheric pressure. The bore 28 contains a step 60 capable of cooperating with an annular member 62 of elastomeric material. Through the member 62 there projects a valve member 64 attached to the piston 54. The end of the valve member widens so as to cooperate in a fluid-tight manner with one side of the annular member 62, and it projects into a delivery chamber 66 communicating directly with the line 20. A powerful spring 68 bearing against a shoulder on the tube 58 by way of a rigid cup 67 urges the differential piston 54 and valve member end 64 on to the housing 10, so that when the pressure in the chamber 12 remains below a predetermined value the compensating valve remains open as shown in FIG. 1. The housing 10 also contains a bypass duct 70 communicating with the line 20 downstream of the compensating valve and giving on to the central bore 28 at 72, opposite the disc 44 adjoining the pressure chamber 52 which is also the intake chamber for the compensating valve.

Movements of the sleeve 40 to either side of its central idle position can operate switch means so as to complete an electrical circuit for a failure warning device. This circuit generally includes a lamp mounted in the driver's compartment of the vehicle. By way of example only, the switch means in this embodiment comprise a groove 74 provided in the outside surface of the sleeve, and a terminal 76 which projects into the groove. The terminal is mounted on the housing 10 in such a way that it is electrically insulated, and it can be connected to the electrical circuit of the warning device. To complete the circuit, the sleeve 40 and housing 10 are made of electrically conductive material, and the housing 10 is connected to the vehicle's earth. The invention also provides means for locking the sleeve when the latter is in a position other than its idle position. The locking means essentially comprise a radially expansible ring 78 mounted in a groove 79 in the outside of the core 34. The ring 78 cooperates with another groove 80 in the inside surface of the sleeve 40. This groove 80 contains two furrows connected by inclined surfaces to a central rib. However, without departing from the invention the locking means may be modified to provide an adequate cooperation between the sleeve and an element fixed to the housing other than the core.

It will be appreciated that the various components of a failure indicator embodying the invention are fairly easy to produce. Assembly of the failure detector is carried out as follows. The ring 78 and the sleeve 40 are placed on the core 34. The disc 42 is mounted on the axial projection 36 attached to the plug 30, and the core is screwed on to the plug 30. Similarly, the disc 44 is mounted on the projection 38 attached to the tube 58, which is then screwed to the core 34. The cup 67, the spring 68, the piston 54 of the braking compensating valve, and the annular member 62 follow. This completes preassembly of a subassembly of the detector which is now simply inserted in the central bore 28 before applying the circlip 82, whereupon the spring 68 holds the various components of the failure detector and of the correcting valve in position. Assembly is completed by inserting the terminal 76.

As already noted, the plugs 30, core 34 and tube 58 are designed as three separate components screwed into one another to permit application of the discs 42, 44. These three components are of course coaxial and are traversed by the duct 59. For reasons of sealing the joins between pairs of components are sited outside the pressure chambers, that is to say, an axial position in that portion of the central bore 28 located between the discs 42, 44. In the embodiment shown in FIG. 1, the core contains two tapped holes which are engaged by two respective threaded spigots 84, 86 attached to the axial projections 34, 36.

The device just described operates as follows. When the two independent brake circuits are operating normally, the various components of the failure detector will remain in the positions shown in FIG. 1. In particular, the sleeve 40, exposed to equal pressures on both sides by way of the resilient discs, will remain stationary when the pressure rises in the chambers 12, 14 of the master cylinder, and the edges of the groove 74 will not make contact with the terminal 76 and thereby operate the failure warning device. However, beyond a certain pressure level termed the transistion pressure, the pressure acting on the differential piston 54 of the compensating valve will move the latter to the left in FIG. 1, counteracting the spring 68, so that the valve end 64 will bear in a fluid-tight manner on the annular member 62. Beyond the transition pressure the valve end 64 will carry out a series of oscillations around its closed position, so that the pressure in the delivery chamber 66 of the compensating valve will increase with the braking pressure in the chamber 12 of the master cylinder, but proportionately and less than this pressure. Note also, to end the description of normal operation of the device embodying the invention, that the disc 44 blocks the orifice 72 of the bypass duct 70.

If one of the two brake circuits fails, for example the circuit associated with the pressure chamber 50, the difference in the pressures acting on the sleeve 40 will move the latter to the left in FIG. 1 into the position illustrated in FIG. 2, the resilient discs 42, 44 being deformed as illustrated in the latter Figure. As a result the terminal 76 cooperates with one side of the groove 74 in the sleeve, so completing the electric circuit of the warning device, which is thus operated; also, the radially expansible ring 78 lodges in one of the two furrows in the groove 80. This arrangement retains the sleeve 40 in the off-centre position shown in FIG. 2 after the brakes of the vehicle are released. At this moment the disc 44, due to its resilience, will resume the shape shown in FIG. 1, so that its left-hand side is detached from the adjoining surface of the sleeve 40. The disc 42, on the other hand, will retain the shape shown in FIG. 2 as the effect of the ring 78 engaged in a furrow in the groove 80 is greater than the reaction force created by the deformation of this disc. When the faulty brake circuit has been repaired, the movable assembly of the detector will resume the idle position shown in FIG. 1 as soon as there is a simultaneous pressure rise in both pressure chambers 12, 14 in the master cylinder. This is because, on pressurization of the chambers 50, 52, the fact that the sleeve 40 and disc 44 are not abutting one another will cause the sleeve 40 to be urged to the right in the Figure by the pressure acting on the disc 42, so that the ring 78 returns to its groove 79 and centres itself again. The sleeve 40 will not pass its central position, as it abuts on the disc 44 again and is consequently balanced.

When the circuit associated with the front brakes 26 of the vehicle, that is, the circuit connected to the chamber 20, is faulty, the deformation of the disc 44 allows a direct connection between the chamber 52 and the duct 70 so that the braking compensating valve is completely short-circuited and the rear brakes 24 of the vehicle are supplied directly by the pressure chamber 12.

The failure detecting device can be installed in the housing 10 without the braking compensating valve. If so, the tube 58 abuts directly on the housing 10 and has no internal duct 59.

In another embodiment (not shown) of the invention the duct 59 is connected to a specific control pressure source to make the braking correction device respond to changes in the load on an axle of the vehicle. To do so, pneumatic or hydraulic fluid is introduced of which the pressure depends on the load applied to the axle concerned. In vehicles in which the trim is corrected by means of a fluid-type suspension apparatus, the duct 59 is connected to a part of the apparatus in which the pressure prevailing responds to the load on the axle. In other vehicles, a hydraulic fluid transmission connected to the duct 59 is associated with a conventional mechanical transmission. This results in modification of the transition pressure as a function of the variation in the load supported by the axle of those vehicle wheels whose brakes are supplied by way of the braking correction device.

What is claimed is:

1. A failure detector for detecting pressure failure in a system having two independent hydraulic circuits comprising a housing with a bore slidably receiving a movable piston-forming assembly so as to define in the bore on opposite sides of the said movable assembly two pressure chambers connectible to the two independent hydraulic circuits, switch means being provided to make electrical contact when the movable assembly moves in either direction from a central idle position due to a pressure difference denoting failure of one of the two independent circuits, a cylindrical core fixed relatively to the housing, the core being coaxial with the bore, said movable assembly comprising a sleeve having the same axial length as the core and two annular resilient discs, said sleeve cooperating with the switch means and being sealingly slidable along the bore and mounted in a fluid-tight manner on two axial projections attached to opposite sides of the core and being smaller in diameter than the core, one face of each resilient disc being partly in contact with one end of the sleeve and partly in contact with one side of the core when the movable assembly is in said central idle position such that the core is entirely contained within the sleeve, means for locking the switch means out of their idle position, the locking means being between the sleeve and an element attached to the housing, said locking means comprising a radially expansible ring mounted in a groove in the core and projecting into another groove in the inside surface of the sleeve, the other groove comprising two furrows connected by inclined surfaces to a central rib.

2. A failure detector for detecting pressure failure in a dual brake system having two independent hydraulic circuits comprising a housing with a bore slidably receiving a movable piston-forming assembly so as to define in the bore on opposite sides of the said movable assembly two pressure chambers connectible to the two independent hydraulic circuits, switch means being provided to make electrical contact when the movable assembly moves in either direction from a central idle position due to a pressure difference denoting failure of one of the two independent circuits, a cylindrical core fixed relatively to the housing, the core being coaxial with the bore, said movable assembly comprising a sleeve having the same axial length as the core and two annular resilient discs, said sleeve cooperating with the switch means and being sealingly slidable along the bore and mounted in a fluid-tight manner on two axial projections attached to opposite sides of the core and being smaller in diameter than the core, one face of each resilient disc being partly in contact with one end of the sleeve and partly in contact with one side of the core when the movable assembly is in said central idle position such that the core is entirely contained within the sleeve, said core being attached to a plug mounted in the housing at one end of the bore, and a braking compensating valve provided at the other end of the bore, the valve comprising a differential piston with an internal blind bore which is slidable in a fluid-tight manner on a tube attached to the core, a duct through the tube being adapted to connect the compartment defined at the blind end of the internal bore with a source of control pressure.

3. A failure detector for detecting pressure failure in a system having two independent hydraulic circuits comprising a housing with a bore slidably receiving a movable piston-forming assembly so as to define in the bore on opposite sides of the said movable piston-forming assembly two pressure chambers connectible to the two independent hydraulic circuits, switch means being provided to make electrical contact when the movable piston-forming assembly moves in either direction from a central idle position due to a pressure difference denoting failure of one of the two independent circuits, said movable piston-forming assembly comprising a sleeve cooperating with the switch means and two resilient elastomeric discs, said movable piston-forming assembly being mounted on supporting means remotely fixed to the housing, said supporting means including a cylindrical rigid core coaxial with the bore and two axial projections extending from opposite sides of the core and being smaller in diameter than the core, said sleeve being slidable along both the bore and the core whereas said discs are axially secured in fluid-tight manner on said axial projections and are sealingly slidable on said bore at their periphery, said sleeve having the same axial length as the core, one face of each resilient disc being partly in contact with one of the sleeve and partly in contact with one side of the core when the movable assembly is in said central idle position such that the core is entirely contained within the sleeve.

4. A failure detector as claimed in claim 3, comprising means for locking the switch means out of its idle position, the locking means comprising a radially expansible ring mounted in a groove in the core and projecting into another groove in the inside surface of the sleeve, the other groove comprising two furrows connected by inclined surfaces to a central rib.

5. A failure detector as claimed in claim 3, for use in a dual brake circuit for a motor vehicle in which the supporting means includes a plug mounted in the housing at one end of the bore, said plug being attached to one side of the core, a braking compensating valve being provided at the other end of the bore, the valve comprising a differential piston with an internal blind bore which receives a tube releasably attached to the other side of the core, a duct through the tube being adapted to connect the compartment defined at the blind end of the internal bore with a source of control pressure.

6. A failure detector as claimed in claim 5, wherein said plug and said tube are screwed to the core, the axial positions of two screwed components being situated between the locations of the two resilient discs.

7. A failure detector as claimed in claim 5, in which one of the said pressure chambers is connectible to the inlet of said braking compensating valve and having a duct bypassing the compensating valve leading into the bore opposite the resilient disc adjoining the said pressure chamber so that fluid can flow in the bypass duct only when a pressure failure occurs in the other pressure chamber.

8. A failure detector as claimed in claim 3, wherein each axial projection is limited by a shoulder on the side remote from the side of the core, so forming a groove receiving the central portion of each resilient disc under slight compression.

9. A failure detector as claimed in claim 3 for use in a dual brake circuit for a motor vehicle, wherein said housing is common with the housing of a dual braking master cylinder of the tandem type, said bore being substantially parallel to the principal bore of the master cylinder.

* * * * *